Patented Apr. 22, 1924.

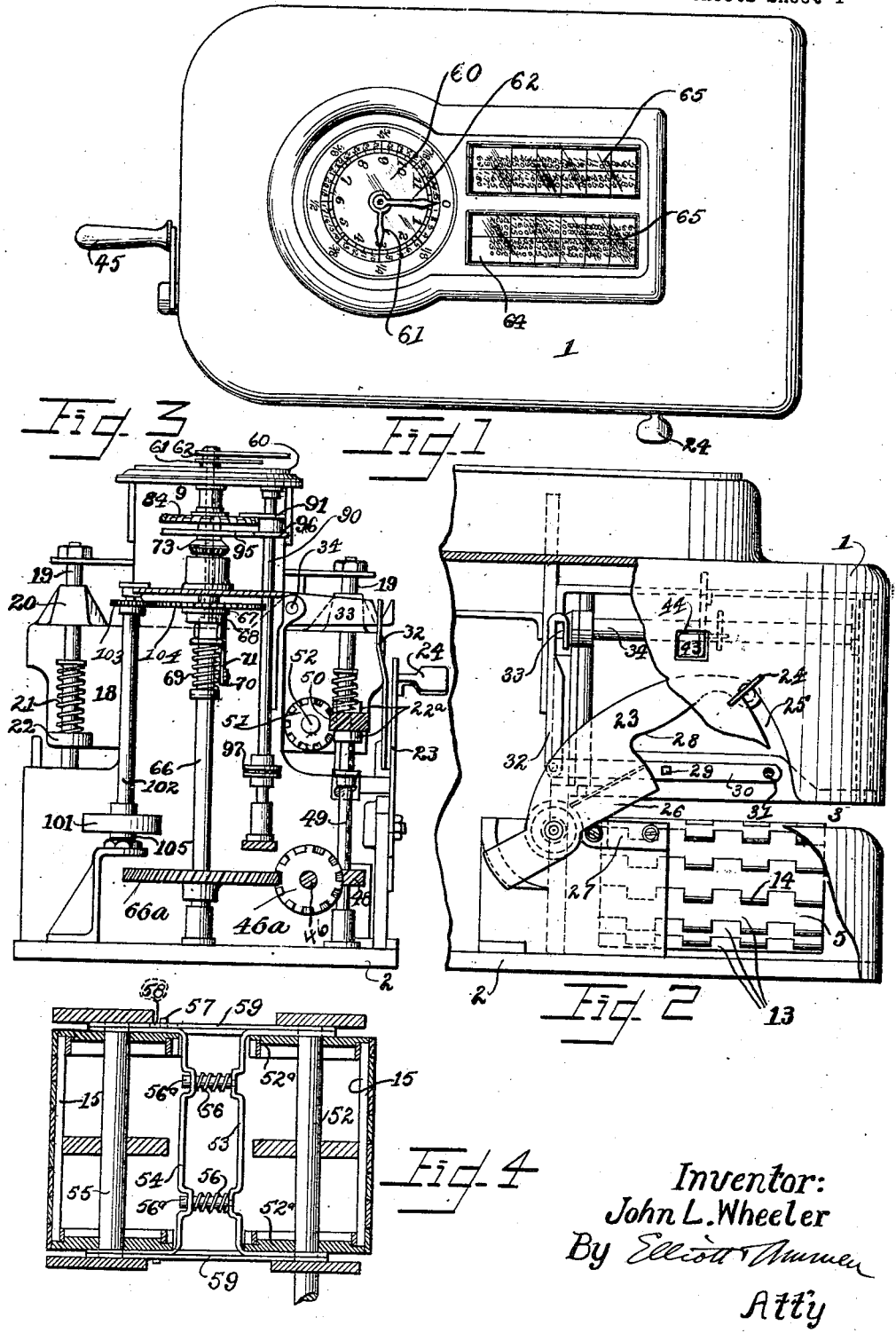

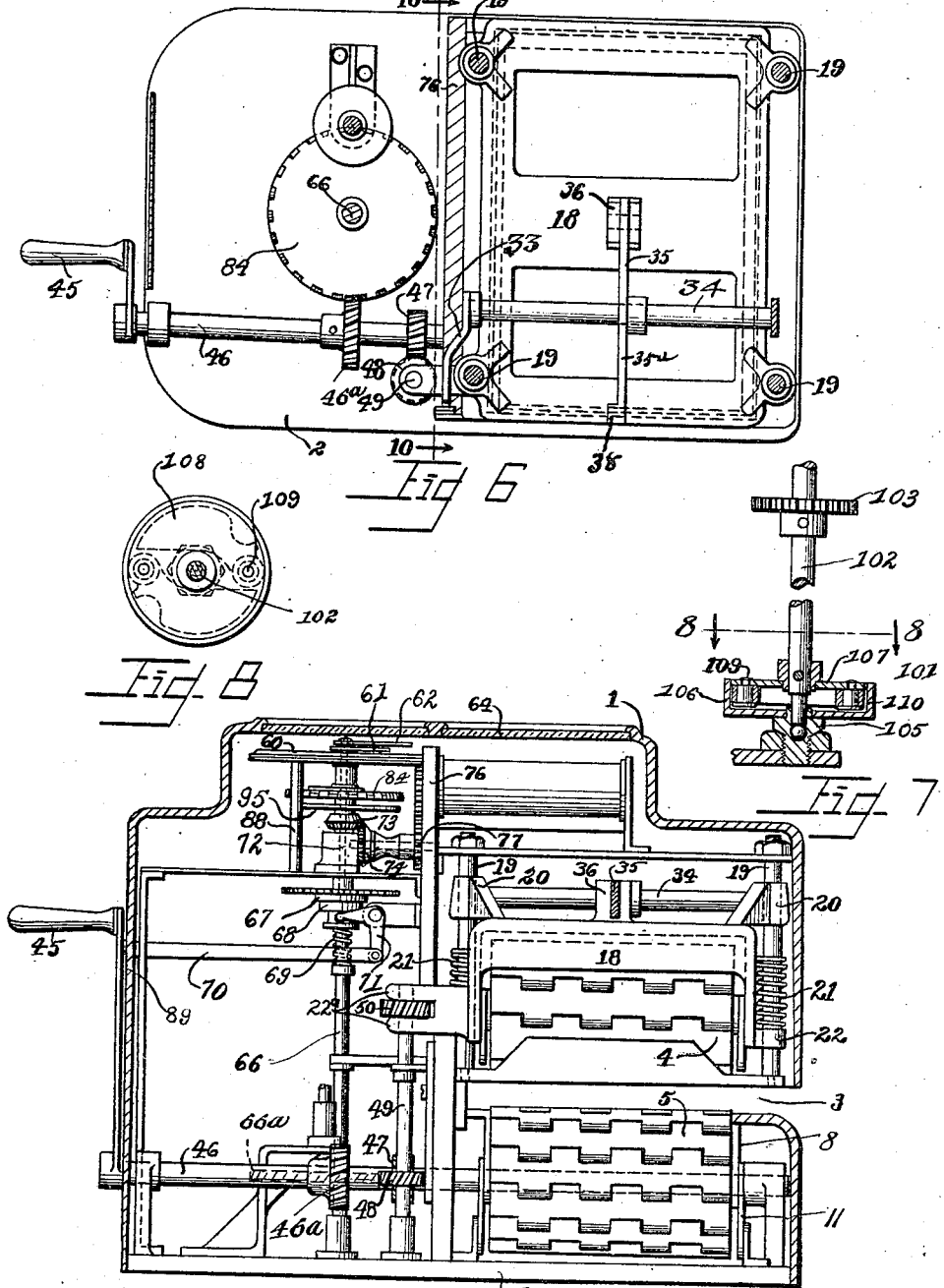

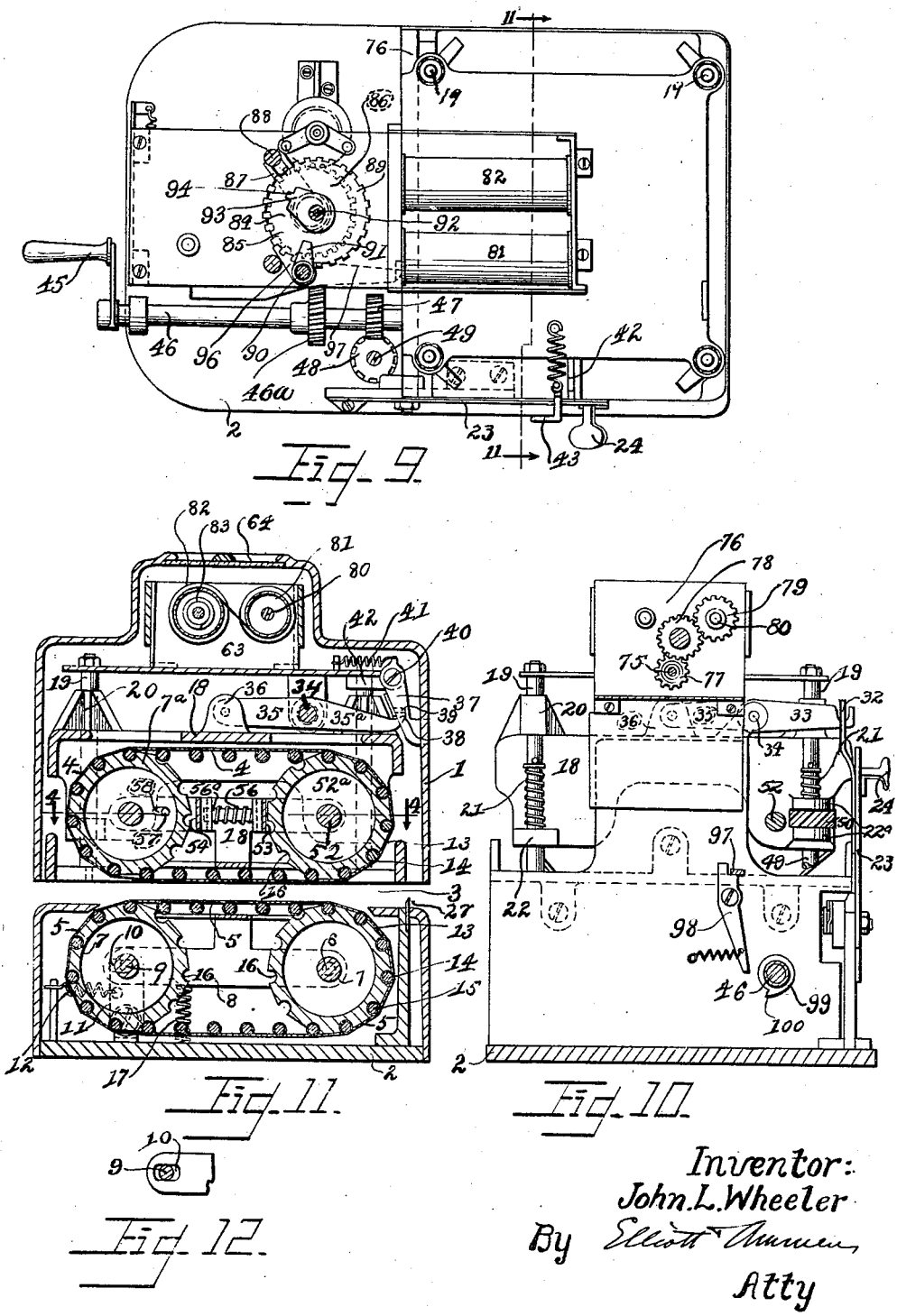

1,491,502

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION.

LACE-MEASURING MACHINE.

Application filed June 28, 1920. Serial No. 392,359.

*To all whom it may concern:*

Be it known that I, JOHN L. WHEELER, a citizen of the United States, residing in the city of St. Louis and State of Missouri, have invented new and useful Improvements in Lace-Measuring Machines, of which the following is a specification.

This invention relates to measuring machines for measuring fabrics, and while features of the invention are applicable to measuring machines of any kind, the invention is expected to be especially useful when applied to machines for measuring delicate fabrics, such as laces, ribbons, etc. Cloth measuring machines usually embody in their construction a measuring roller with which co-operates a presser roller, and in using the machine the fabric is pulled between the two rollers, the movement of the fabric operating to rotate the measuring roller and in this way driving the indicating mechanism. While such construction is well adapted for measuring cloth or other tightly woven fabrics, it is not well adapted for measuring delicate fabrics such as laces. The general object of my invention is to provide improved means for measuring laces and delicate fabrics without subjecting the same to tension, and to provide simple means for facilitating the introduction of the lace into the machine preparatory to measuring the same. According to my invention I employ movable belts between which the lace passes, and one of the objects of my invention is to construct these belts in such a way as to insure accuracy in the measuring movement which is imparted to the indicating mechanism.

Further objects of the invention will appear hereinafter.

The invention consists in the novel features, and in the general combination of parts to be particularly described hereinafter, all of which contribute to produce a simple and efficient lace measuring and cost computing machine. A preferred embodiment of my invention will be particularly described in the following specification, while the broad scope of the invention will be pointed out in the appended claims.

Figure 1 is a plan of a machine embodying the invention;

Figure 2 is a front elevation of the right hand portion of the machine, certain parts being broken away or shown in section;

Figure 3 is an end elevation of the left end of the machine as viewed in Figure 1 with the casing or case removed;

Figure 4 is a horizontal section taken about on the line 4—4 of Figure 11;

Figure 5 is a longitudinal vertical section through the machine;

Figure 6 is a horizontal section taken through the upper part of the machine with the casing removed;

Figure 7 is a vertical section partially broken away illustrating the governor device;

Figure 8 is a horizontal section taken about on the line 8—8 of Figure 7;

Figure 9 is a plan of the machine with the casing removed;

Figure 10 is a vertical section taken about on the line 10—10 of Figure 6, certain parts being omitted;

Figure 11 is a vertical section through the machine taken on the line 11—11 of Figure 9; and Figure 12 is a fragmentary detail.

Referring more particularly to the parts, the machine comprises a large case 1 in the upper portion of which parts of the indicating mechanism are visible (see Fig. 1). This case is mounted so as to be removable to expose the mechanism of the machine which is mounted on a base plate 2 (see Fig. 3). At the right end of the machine as viewed in Figure 1 and in the lower portion of the case 1, a horizontal gap 3 is formed (see Fig. 2), and through this gap the fabric to be measured passes. Adjacent to this gap I provide a pair of oppositely disposed endless belts 4 and 5 (see Fig. 11) and I provide means for supporting these belts in such a way as to permit the adjacent runs of the belts to be driven in the same direction, that is to say, the adjacent runs of the belts may be held together so as to press the fabric between them. When the fabric is held in this way the belts are driven, and I provide indicating mechanism which is driven in unison with the belts for indicating substantially the amount of lineal movement or travel of the belts. In order to accomplish this the belt 5 is mounted so that it is relatively fixed, that is to say, it is mounted below the gap 3 in such a way that its supporting frame has no vertical movement, that is, lateral to the longitudinal axis of the frame; the mounting for this belt comprises a fixed shaft 6 (see Fig. 11) which carries one of two pulleys or wheels 7, the other pulley 7 being carried by a frame comprising two oppositely disposed bars 8 (see Fig. 5) between which a shaft 9 is carried, and the ends of this shaft 9 are received in longitudinal slots 10 formed in the bars 8; this shaft 9 carries one of the pulleys 7 and is supported on a pair of links 11 which are pivotally mounted on the base plate, and these links are pulled away from the shaft 6 by means of springs 12. The purpose of these springs is to maintain the belt 5 in a taut condition. The belts 4 and 5 are of similar construction and are simply formed of a plurality of transverse plates 13 (see Figs. 2 and 11) which are connected by sleeves forming hinge joints 14, with cross pins or bars 15 which are received in sockets or notches 16 in the wheels 7. Springs 17 are provided which pull the frame bars 8 downwardly and take up any lost motion or inaccuracy in fit between the bars 8 and the links 11.

The upper belt 4 is a relatively movable belt, that is to say, it is movable vertically, or laterally with respect to the longitudinal axis of the belt so as to be held raised away from the belt 5 as indicated in Figure 11, or moved toward the belt 5 so that the adjacent runs of the belts will come together. In order to accomplish this, I mount the belt 4 on a floating frame or carriage 18 which is guided to move up or down on suitable guides in the form of four posts 19, the frame 18 being provided with guide sleeves 20 which slide on these posts and maintain the belts in a parallel relation. Resilient means is provided tending to force this floating frame down so as to press the belt 4 resiliently against the belt 5; for this purpose the posts 19 are provided with spiral springs 21 (see Fig. 10) which thrust down upon collars or lugs 22 formed on the floating frame and which slide on the posts.

Any suitable means may be provided for raising this floating frame. I prefer to construct this means so that it is automatically operated by the marking means or knife which indicates the point where the fabric is to be cut off after making a measurement. For this purpose, the front of the machine is provided with marking means which may comprise a marking lever or knife lever 23 (see Fig. 2); the end of this lever being provided with a thumb plate 24 which runs in an arcuate slot 25 in the side of the casing. This lever 23 carries a knife or cutter 26 which co-operates with a fixed blade or cutter 27 so as to snip the edge of the fabric. When this knife lever 23 is depressed, its edge at 28 engages with a projection 29 on a lever 30 pivoted at 31 (see Fig. 2), and this lever 30 operates to effect the raising of the floating frame. This is accomplished by means of a link 32 which is attached to the end of the lever 30, and the upper end of this link engages the end of an arm 33 (Figs. 3 and 6) mounted on a rock shaft 34 which extends horizontally in the upper portion and at the forward side within the casing. Near its middle point this rock shaft carries a lever 35 which extends inwardly, and its inner end is pivotally attached to a lug 36 which occupies a substantially central position with respect to the guide posts 19 and may be formed as an integral lug projecting up from the upper face of the floating frame 18. This lever 35 has an arm 35ᵃ which co-operates with detent means in the form of a latch 37 (see Fig. 11) to enable the floating frame to be latched in a raised position. For this purpose, the side of the arm 35ᵃ is provided with a laterally projecting dog or tooth 38 Fig. 6; when the floating frame is raised this tooth 38 moves past and snap under a corresponding tooth 39 (see Fig. 11) which is formed on the side of the latch lever 37. This latch lever is pivoted at 40 and is pulled by a spring 41 into its extreme or latching position; this latch is mounted on a small bracket 42 (see Fig. 11) and its outer end is bent laterally to form a thumb plate 43 (Figs. 2 and 9) which is mounted in an opening at 44 in the front wall of the casing. By pushing in on the thumb plate 43 of this latch 37 the tooth 39 can be moved out of alignment with the tooth 38 whereupon the springs 21 on posts 19 will operate to move the floating frame downwardly and press the belt 4 against the belt 5.

The belts may be driven by a common driving member such as a hand lever 45, (see Fig. 6) which is carried on a shaft 46, the inner end of which carries a spiral gear 47 meshing with a spiral gear 48 on a vertical shaft 49 (see Fig. 6). The shaft 46 is an extension of the shaft 6 (see Fig. 11) so that a rotation of the shaft 46 directly rotates the shaft 6, thereby driving the belt 5. The shaft 49 is for the purpose of driving the upper belt. Any suitable connection may be used for this purpose. In the present instance, I have formed one of the lugs 22 (see Figs. 3 and 10) so that it is bifurcated, the space between the two lug sections 22ᵃ carrying a splined spiral gear 50 which meshes with a spiral gear 51 on the end of the shaft 52 which carries wheels 52ᵃ for the right end of the belt 4 (see Fig. 11). In order to maintain the belt 4 in tension I may provide a small extension frame (see Fig. 4), comprising two yokes 53 and 54, the yoke 54 carrying a shaft 55 and being pressed away from the yoke 53 by means of small springs 56 mounted on sliding pins 56ᵃ attached to yoke 53 and sliding through yoke 54. A pin-andslot connection may be provided, (see Fig. 11), including a pin 57 carried on the yoke 54 and a slot 58 formed in a side bar 59, the end of which is pivotally mounted on the shaft 52. This construction is duplicated at each side of the extension frame and the function of the bars 59 is simply to support the yoke 54 and permit the shaft 55 to be moved slightly away from the shaft 52. (See Fig. 4.)

The indicating mechanism includes a dial 60 (see Fig. 1) with hands or pointers 61 and 62 for indicating yards and fractions thereof. The indicating mechanism also includes a chart 63 which is visible through windows 64 (see Fig. 11) in the upper side of the casing, and this chart carries numbers which lie opposite to price numbers placed upon two scales 65. I provide suitable means for driving this indicating mechanism in unison with the measuring belts, so that it will indicate substantially the measurement of the fabric that has passed between the belts. For this purpose I provide a vertical driving shaft 66 driven from shaft 46 by helical gears or spiral gears 46$^a$ and 66$^a$, (see Fig. 3); the upper end of this shaft is provided with a friction clutch 67 (Fig. 5) including a movable clutch member 68 and having a spring 69 for holding the clutch closed. This clutch may be opened at will by means of a push bar 70 attached to a bell crank lever 71, one arm of which controls the movable clutch member 68. This clutch drives a vertical spindle 72 carrying a bevel gear 73 that meshes with a bevel gear 74, the latter being carried on a horizontal shaft 75 (see Fig. 10) that extends out from the side of a vertical frame plate 76. Adjacent to this frame plate, the horizontal shaft 75 carries a pinion 77 that meshes with an idler 78 on the face of this plate and this idler drives a gear wheel 79 which is rigidly mounted upon a shaft 80 which carries a take-up roller 81 (Figs. 9 and 11) upon which the chart or web 63 winds. When the machine is in its zero position the main portion of the web or chart 63 is wound upon a supply roller 82 which is mounted so that as the chart is wound off of this roller, the torsion or tension of the spring is increased. The chart 63 has tabulated figures on both sides of it, which co-operate with the two scales 65 to indicate the charge to be made for the indicated measurement.

Above the bevel pinion 73 I provide reduction gearing 84 (see Fig. 5). This reduction gearing comprises an eccentric 85 (see Fig. 9) which is rigid with the spindle 72. This eccentric is mounted to rotate in an opening in a gear wheel 86 (see Fig. 9); secured to the gear wheel 86 there is provided a bar 87 having a bifurcated end which engages a post 88. The teeth of the gear 86 engage the teeth of a larger gear 89. These two gears 86 and 89 have nearly the same number of teeth, but the inner gear 86 has less teeth than the gear 89, the arrangement being such that one or more tooth spaces will be dropped at the end of each cycle of movement of the gear wheel 86; this will give a 12-to-1 reduction in the drive. Hence, if the hand 62 which indicates inches is carried by the spindle 72, then the hand 61 which indicates yards will be driven at the proper speed.

The end of the push bar 70 carries a push plate (not illustrated), which is disposed in an opening in the wall 89 of the casing. When the push bar 70 is operated to open the clutch the spring 83 (Fig. 11) will operate to return the indicating mechanism to zero, that is to say, it will drive the hands or pointers 61 and 62 in a reverse direction and will rewind the chart 63 onto the supply roller 82. In order to stop the indicating mechanism at the zero position and also at the limit of the measuring movement of the machine, I provide a vertical shaft 90 (see Figs. 3 and 9). This shaft is provided at its upper end with a finger 91 which projects across the upper face of the gear wheel 89. Rigid on a sleeve 92 that carries the slow moving pointer 61, there is provided a plate 93 which terminates in a dog 94. Just below this point the spindle 72 carries rigidly a stop-plate 95 which is simply a disk with a notch in its edge. Opposite this disk the rock shaft 90 carries a pawl 96. Now, when the mechanism is returning to zero, the dog 94 rotates in an anti-clockwise direction, and just as the mechanism arrives at the zero position the dog 94 will strike the pawl 91; this will rock the rock shaft 90 in a clockwise direction and move the pawl 96 into engagement with the stop wheel; this will stop the indicating mechanism at zero.

On the other hand, as the indicating mechanism is arriving at the limit of the measuring capacity, the dog 94 will strike the right hand side of the finger 91 and this will rock the shaft 90 in an anti-clockwise direction. The rock shaft 90 carries a lever 97 in its lower end (see Figs. 9 and 10) and this lever extends over to the right as viewed in Figure 9, and engages the upper end of a stop lever 98 (see Fig. 10); the lower end of this lever 98 lies near a stop collar 99 carried on the shaft 46 (see Fig. 10). When the rock shaft 90 is rotated in an anti-clockwise direction, the lower end of the stop lever 98 will be thrown into the path of a tooth 100 on the collar 99 and this will stop the rotation of the shaft 6.

In order to prevent the machine from racing when returning to zero I provide a centrifugal governor 101 (see Figs. 3, 7 and 8). This governor is carried at the lower end of a vertical governor shaft 102 which is rotated at a relatively high speed by means of a pinion 103 on its upper end which meshes with a driving gear wheel 104 carried on the shaft 66 just above the clutch. The lower end of this shaft 102 is mounted in a suitable step bearing 105 to which there is fixed a small casing in the form of a shallow cup 106. On the lower end of the shaft 102 a disk 107 is carried and on the underside of this disk centrifugal weights 108 are pivotally mounted at 109. These weights will fly out under the action of centrifugal force and operate as friction brake shoes against the inner face of the cylindrical wall 110 of the cup 106.

I shall now describe briefly the general mode of operation of the entire machine.

Supposing that the floating frame 18 is in the elevated position shown in Figure 11. The lace or other fabric to be measured would be introduced into the gap or throat 3 and held in position so that the forward edge of the fabric is about in alignment with the knife 26. The indicating mechanism having been set back to zero by pushing the bar 70, the operator then pushes in on the thumb plate 43 (Fig. 9) which actuates the latch 37 (Fig. 11) to release the lever 35. This permits the springs 21 on ports 19 (Figs. 3 and 11) to move the floating frame 18 down, to press the endless belts 4 and 5 into cooperative relation, that is to say they yieldingly clamp or press the lace between them. The operator then rotates the crank 45 which actuates the shaft 46, which is really an extension of the shaft 6 of the wheel 7 which carries the lower belt 5; this actuates the lower belt. The upper belt 4 is actuated through the spiral gears 47 and 48 (Fig. 9) which actuate the vertical shaft 49, the upper end of which shaft carries the splined spiral gear 50 (see Fig. 3), which meshes with a corresponding gear 51 on the shaft 52 that carries the yoke 53 (Fig. 4) corresponding to the upper belt 4. The fact that the spiral gear 50 is splined on the vertical shaft 49, permits this raising and lowering of the floating frame 18, at the same time maintaining driving connection to the upper belt. The rotation of the shaft 46 (Fig. 3) in driving the belts also operates to drive the indicating mechanism in unison with the belts. This is accomplished through the rotation of the shaft 66 (see Fig. 5).

After the measurement is completed the operator actuates the knife lever 23 to mark the fabric at the point where it is to be cut off. The depression of the knife lever operates the lever 30 (see Fig. 2) and this pulls down on link 32 and operates the arm 33 to produce a rocking movement in the shaft 34; as the shaft 34 rocks, the lever 35 carried by it (see Fig. 11) raises the floating frame 18 and moves it away from the lower belt 5, and as this occurs the outer end of the lever arm 35ª engages over the tooth 39 of the latch 37. In this way the floating frame becomes latched automatically in a raised position. Through the co-action of the finger 91 and the dog 94 (Fig. 9) the indicating mechanism is stopped automatically at the zero position when returning to zero; and also at the limit of the measuring movement, when measuring. In returning the indicating mechanism to zero it is simply necessary to open the clutch by shoving in on the push-bar 70 (Fig. 5); this opens the clutch 67, and the spring 83 in the supply roller 82 (Fig. 11) then returns the indicating mechanism to zero.

It is understood that the embodiment of the invention described herein is only one of the many embodiments my invention may take, and I do not wish to be limited in the practice of my invention nor in my claims, to the particular embodiment set forth.

What I claim is:

1. In a fabric measuring machine, the combination of a casing, a relatively fixed endless belt mounted therein, a floating frame mounted in the casing, an endless belt mounted thereupon, means for guiding said floating frame at a plurality of points to move the latter endless belt toward or from the first named endless belt, resilient tension means associated with each guiding means, tending to force the floating frame toward the relatively fixed belt, marking means for marking the fabric to indicate the point where it is to be cut off, means actuated by the marking means for raising the floating frame away from the relatively fixed belt, means to latch the floating frame in its raised position, and indicating mechanism actuated in unison with the belts to indicate the measurement of fabric passing between the belts.

2. In a fabric measuring machine, the combination of a relatively fixed endless belt, a floating frame, an endless belt mounted thereupon, means for guiding said floating frame to move the latter endless belt toward or from the first named endless belt, resilient means tending to force the floating frame toward the relatively fixed belt, marking means for indicating the point where the fabric is to be cut off, means actuated thereby for moving the floating frame into a raised position away from the relatively fixed belt, latching means for automatically latching the floating frame in its raised position, means for driving both the belts, and indicating mechanism driven in unison with the belts to indicate the measurement of fabric passing between the belts.

3. In a fabric measuring machine, the combination of a relatively fixed endless belt, a floating frame, an endless belt mounted thereupon, a plurality of guides for guiding said floating frame to move toward or from the first named endless belt, a lever for raising the floating frame, connected with the same at a substantially central point with respect to said guides, resilient means tending to move the floating frame down toward the relatively fixed belt, means for driving both of the belts, indicating mechanism actuated in unison with the belts to indicate the measurement of fabric passing between the belts, marking means for indicating the point where the fabric is to be cut off, means actuated thereby for moving said lever to raise the floating frame away from the relatively fixed belt, and latching means co-operating with the lever to latch the floating frame away from the relatively fixed belt.

4. In a fabric measuring machine, the combination of a pair of oppositely disposed endless belts, a belt frame and wheels carried thereby corresponding to each belt resilient means operating upon the wheels for each belt to maintain the belts extended, means for holding the belts apart to permit a fabric to be introduced therebetween, means for holding the belts together to press the fabric, a common driving member with means actuated thereby for driving the belts when they are held together, and indicating means actuated in unison with the belts to indicate the measurement of the fabric passing between the belts.

5. In a machine for measuring delicate fabrics, the combination of a casing, a pair of oppositely disposed endless belts, a relatively fixed belt frame mounted in the casing carrying one of the belts, a relatively movable belt frame carrying the other belt, wheels carried by said belt frames over which the belts run, means for guiding the movable belt frame to enable the belt carried thereby to be moved laterally toward or from the other belt, while maintaining the belts parallel with each other, detent means for holding the relatively movable belt frame in a position to maintain its belt away from the opposite belt to enable the fabric to be introduced between the belts, means operable at will for releasing the detent means, means for yieldingly pressing the laterally movable belt frame toward the other belt frame when the detent means has been released, means for driving the belts, and indicating mechanism driven in unison with the belts for indicating the amount of travel of the belts.

In testimony whereof, I have hereunto set my hand.

JOHN L. WHEELER.